(12) United States Patent
Hosaka et al.

(10) Patent No.: US 10,137,787 B2
(45) Date of Patent: Nov. 27, 2018

(54) REGENERATIVE CONTROLLER FOR ELECTRIC MOTOR, REGENERATIVE DRIVER FOR ELECTRIC MOTOR, AND POWER-ASSISTED VEHICLE

(71) Applicant: TAIYO YUDEN CO., LTD., Tokyo (JP)

(72) Inventors: Yasuo Hosaka, Tokyo (JP); Taichi Yanaoka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 85 days.

(21) Appl. No.: 15/342,876

(22) Filed: Nov. 3, 2016

(65) Prior Publication Data

US 2017/0129341 A1    May 11, 2017

(30) Foreign Application Priority Data

Nov. 9, 2015  (JP) ................................. 2015-219584
Apr. 18, 2016  (JP) ................................. 2016-082826

(51) Int. Cl.
*B60L 7/18*        (2006.01)
*B60L 11/00*       (2006.01)
(Continued)

(52) U.S. Cl.
CPC .............. *B60L 7/18* (2013.01); *B60L 11/007* (2013.01); *B60L 11/1809* (2013.01);
(Continued)

(58) Field of Classification Search
CPC .... B60L 7/18; B60L 11/1861; B60L 11/1809; B60L 11/007; B60L 2200/12;
(Continued)

(56) References Cited

U.S. PATENT DOCUMENTS

| | | | |
|---|---|---|---|
| 6,222,334 B1 * | 4/2001 | Tamagawa | ................ B60L 7/10 180/65.21 |
| 2012/0316709 A1 | 12/2012 | Saida | |
| 2014/0375115 A1 * | 12/2014 | Ajiro | ........................ B60T 1/10 303/152 |

FOREIGN PATENT DOCUMENTS

| | | |
|---|---|---|
| CN | 101121434 A | 2/2008 |
| EP | 1886913 A2 | 2/2008 |

(Continued)

OTHER PUBLICATIONS

Cikanek et al., Regenerative Braking system for a hybrid electric vehicle, IEEE, pg. (Year: 2002).*

(Continued)

*Primary Examiner* — McDieunel Marc
(74) *Attorney, Agent, or Firm* — Chen Yoshimura LLP

(57) ABSTRACT

A regenerative controller for an electric motor includes: a wheel rotation detection unit provided on a vehicle and detecting a rotation amount of a wheel that is driven via a crank rotated by human power; a crank rotation detection unit that detects a rotation amount of the crank; and a controller that calculates a first value based on the rotation amount of the wheel, a second value based on the rotation amount of the crank, and a control parameter based on at least the second value among the first value and the second value for regenerative control of a power storage device regeneratively charged by an electric motor that supplies driving power to the wheel, the controller controlling a regeneration amount of the electric motor in accordance with the control parameter.

20 Claims, 13 Drawing Sheets

(51) Int. Cl.
  *B60L 11/18* (2006.01)
  *B62M 6/50* (2010.01)
  *B62M 6/90* (2010.01)

(52) U.S. Cl.
  CPC .......... *B60L 11/1861* (2013.01); *B62M 6/50* (2013.01); *B62M 6/90* (2013.01); *B60L 2200/12* (2013.01); *B60L 2250/24* (2013.01); *B60L 2250/26* (2013.01)

(58) Field of Classification Search
  CPC ... B60L 2250/24; B60L 2250/26; B62M 6/50; B62M 6/90
  See application file for complete search history.

(56) References Cited

FOREIGN PATENT DOCUMENTS

| | | |
|---|---|---|
| JP | H9-254861 A | 9/1997 |
| JP | 5211181 B2 | 6/2013 |
| TW | 201221383 A1 | 6/2012 |

OTHER PUBLICATIONS

Powell et al, Dynamic Modeling and Control of Hybrid Electric Vehicle Powertrain Systems IEEE, pg. (Year: 1998).*
Cikanek et al., Control System and Dynamic Model Validation for a Parallel Hybrid Electric Vehicle, 1999, IEEE, p. 1222-1227 (Year: 1999).*
Taiwanese Office Action dated May 11, 2017, in a counterpart Taiwanese patent application No. 105135328.

\* cited by examiner

| Item | Case1 | Case2 | Case3 |
|---|---|---|---|
| Wheel Speed | 20km/h | 20km/h | 20km/h |
| Crank Speed | 20km/h | 15km/h | 5km/h |
| Crank Torque | 10Nm | 0Nm | 0Nm |
| Regeneration determination based on rotation amount of crank (comparison example) | OFF | OFF | ON |
| Regeneration determination in present embodiment | OFF | ON | ON |
| Driving Operation | ON | OFF | OFF |

FIG. 4

| Item | Case4 | Case5 | Case6 |
| --- | --- | --- | --- |
| Wheel Speed | 30km/h | 30km/h | 30km/h |
| Crank Speed | 30km/h | 20km/h | 24km/h |
| Crank Torque | 10Nm | 0Nm | 0Nm |
| Regeneration determination based on rotation amount of crank (comparison example) | OFF | OFF | OFF |
| Regeneration determination in present embodiment | OFF | ON | ON |
| Driving Operation | OFF | OFF | OFF |

FIG. 5

REGENERATIVE CONTROLLER FOR ELECTRIC MOTOR, REGENERATIVE DRIVER FOR ELECTRIC MOTOR, AND POWER-ASSISTED VEHICLE

BACKGROUND OF THE INVENTION

Technical Field

The present invention relates to a regenerative controller for an electric motor, a regenerative driver for an electric motor, and a power-assisted vehicle.

Background Art

In power-assisted vehicles equipped with a battery and motor, such as power-assisted bicycles, power supplied from a rechargeable battery drives the motor, and the power generated by the motor can regeneratively charge the battery. This type of regenerative operation performs regenerative control that is aligned with the intentions of the rider, which makes it possible to operate the power-assisted vehicle without causing discomfort to the rider.

For example, there is a known control technique in which a sensor is attached to the brake bar, and if the sensor detects the rider operating the brakes, regenerative control is performed (Patent Document 1). There is also a known control technique in which rotation information of a crank is detected with a sensor, and when the crank rotation amount is below a prescribed minimum and the vehicle speed is at least a prescribed speed, regenerative control is performed (Patent Document 2).

RELATED ART DOCUMENTS

Patent Documents

Patent Document 1: Japanese Patent Application Laid-Open Publication No. H9-254861
Patent Document 2: Japanese Patent No. 5211181

SUMMARY OF THE INVENTION

However, in the technique in Patent Document 1, regenerative control is only performed when the rider intentionally operates the brakes, and thus power recovery is limited to such a time. In other words, regenerative charging is not performed during the period between the start of coasting of the power-assisted vehicle and the brakes operating.

Furthermore, in the technique in Patent Document 2, regenerative charging is performed when the crank rotation amount is below a prescribed value, which makes it necessary to set an appropriate prescribed value. Moreover, regenerative control is not performed when the crank rotation amount is the prescribed number or higher.

As a countermeasure, the present invention aims at providing a regenerative controller for an electric motor, a regenerative driver for an electric motor, and a power-assisted vehicle that can increase the opportunities for recovering regenerative power by wide-range regenerative control in various riding states of the power-assisted vehicle. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a regenerative controller for an electric motor that supplies driving power to a vehicle and that regeneratively charges a power storage device in the vehicle, including: a wheel rotation detection unit to be provided on the vehicle detecting a rotation amount of one of wheels of the vehicle; a crank rotation detection unit to be provided on the vehicle detecting a rotation amount of a crank that is rotated by human power to drive one of the wheels of the vehicle; and a controller that calculates a first value based on the detected rotation amount of the one of the wheels, a second value based on the detected rotation amount of the crank, and a control parameter based on at least the second value among the first value and the second value, the controller determining whether to perform regeneration charging of the power storage device via the electric motor based on a relative difference between the first value and the second value, and when the regeneration charging is determined to be performed, the controller determining a regeneration amount of the electric motor in accordance with the control parameter, and controlling the electric motor such that the electric motor regeneratively charges the power storage device at the determined regeneration amount.

Other problems and methods of solving the problems will become apparent by the disclosures in the embodiments, the drawings, and the like.

The present invention makes it possible to increase the opportunities for recovering regenerative power by wide-range regenerative control in various riding states of a vehicle. It is to be understood that both the foregoing general description and the following detailed description are exemplary and explanatory, and are intended to provide further explanation of the invention as claimed.

BRIEF DESCRIPTION OF THE DRAWINGS

FIG. 4 is a view of an example of the relationship between riding states of a vehicle and electric motor operation in the present embodiment.

FIG. 5 is a view of another example of the relationship between riding states of a vehicle and electric motor operation in the present embodiment.

DETAILED DESCRIPTION OF EMBODIMENTS

Figure 1:
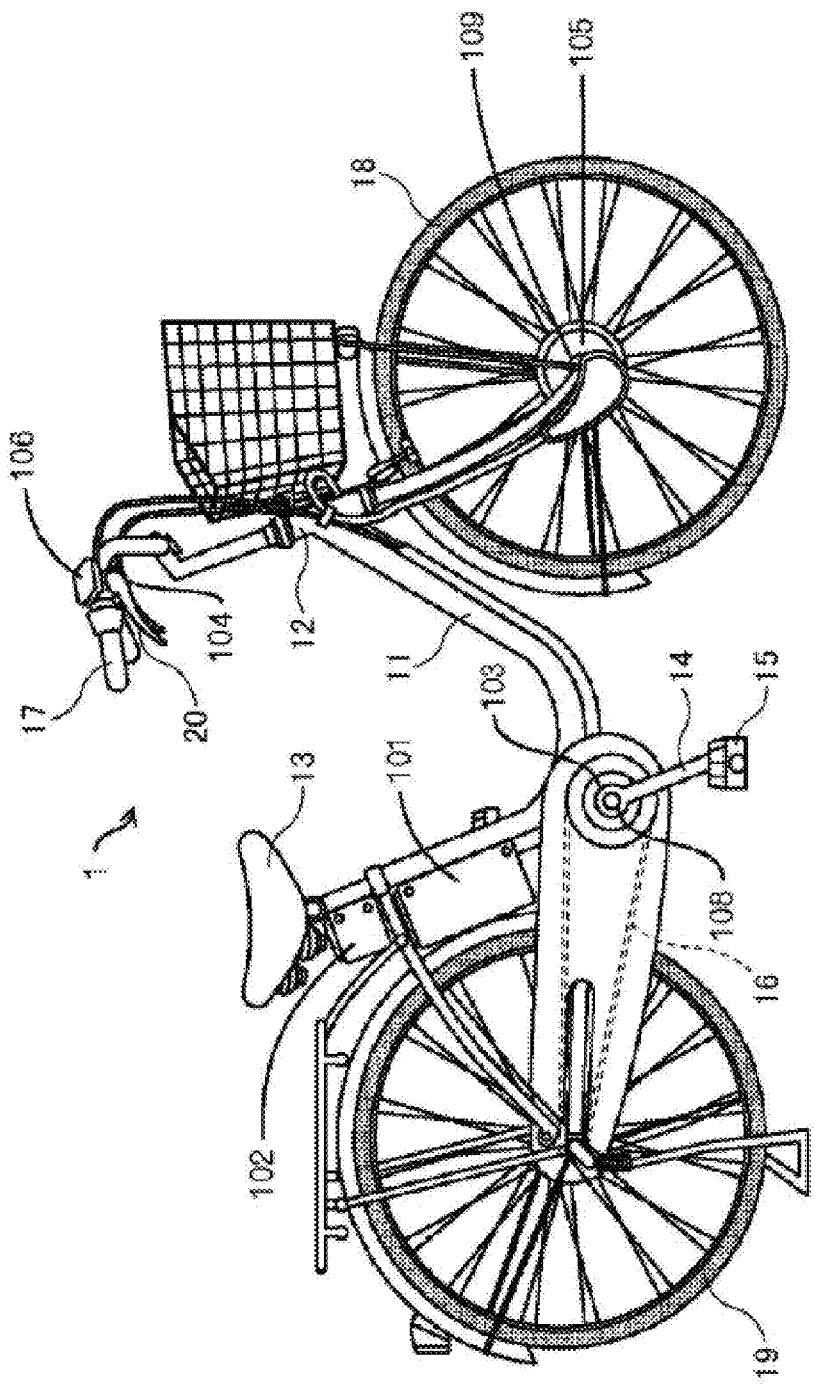
FIG. 1 is an exterior view showing an example of a power-assisted bicycle equipped with a regenerative controller of the present embodiment.

Embodiments of the present invention will be described below with reference to the drawings as needed. A power-assisted bicycle will be described as one example of a power-assisted vehicle, but the present invention is not limited to a power-assisted bicycle. The same or similar constituting elements in the drawings are given the same or similar reference characters.

(Complete Configuration of Power-assisted Bicycle)

The complete configuration of the power-assisted bicycle 1 will be described with reference to FIG. 1. FIG. 1 is an external view of the power-assisted bicycle 1 of the present embodiment. As shown in FIG. 1, the power-assisted bicycle 1 is mainly constituted by a frame 11, saddle 13, crank 14, handle 17, wheels 18 & 19, rechargeable battery 101, controller 102, and motor 105. The rechargeable battery 101 is one example of a storage battery, and the motor 105 corresponds to an electric motor.

Specifically, the handle 17 is attached to one end of the frame 11 via a front pipe 12, and the saddle 13 is attached to the other end of the frame 11. The handle 17 has attached thereto a brake lever 20 for operating the brakes, a brake sensor 104 for detecting the operation amount of the brake lever 20 by the rider, and an operation panel 106 for selecting a plurality of operation modes exhibiting differing degrees of assistance and regenerative charging by electric motor-driven force.

The frame 11 also has the crank 14 attached thereto. The crank 14 rotates by the pedal force of the rider acting on the crank via the pedal 15. The crank 14 includes a torque sensor 103 that detects torque generated at the crank 14 by the pressing of the pedal 15 by the rider, and a crank rotation sensor 108 that detects rotation of the crank 14.

The wheel 18 is on the bottom end of the front pipe 12 and embeds the motor 105 in a hub (not shown). The motor 105 rotatingly drives the wheel 18, and the rotation of the wheel 18 is detected by a front-wheel rotation sensor 109 attached to the wheel 18. The wheel 18 and the motor 105 thus constitute an electric motor driving mechanism. In the present embodiment, a brushless direct-current motor is used as the motor 105, but a motor other than a brushless direct-current motor may be used instead.

The wheel 19 is on the side of the crank 14 opposite to the wheel 18 and is rotatingly driven by receiving the pedal force of the rider via a chain 16 installed between the crank 14 and the wheel 19. In this manner, the crank 14, chain 16, and wheel 19 form a man-driven mechanism. This man-driven mechanism may include a variable speed mechanism. Furthermore, a transmission belt may be used instead of the chain 16.

The rechargeable battery 101 is placed between the frame 11 and wheel 19 so as to be freely attachable/detachable. The controller 102 is also attached between the rechargeable battery 101 and the saddle 13. The controller 102 has a control circuit embedded therein and drives or regeneratively charges the motor 105 in accordance with output signals from the various types of sensors described above. In this manner, the controller 102 functions as the regenerative controller of the electric motor. Moreover, the motor 105 and the controller 102 form the regenerative driver of the electric motor.

(Configuration of Controller)

Figure 2:
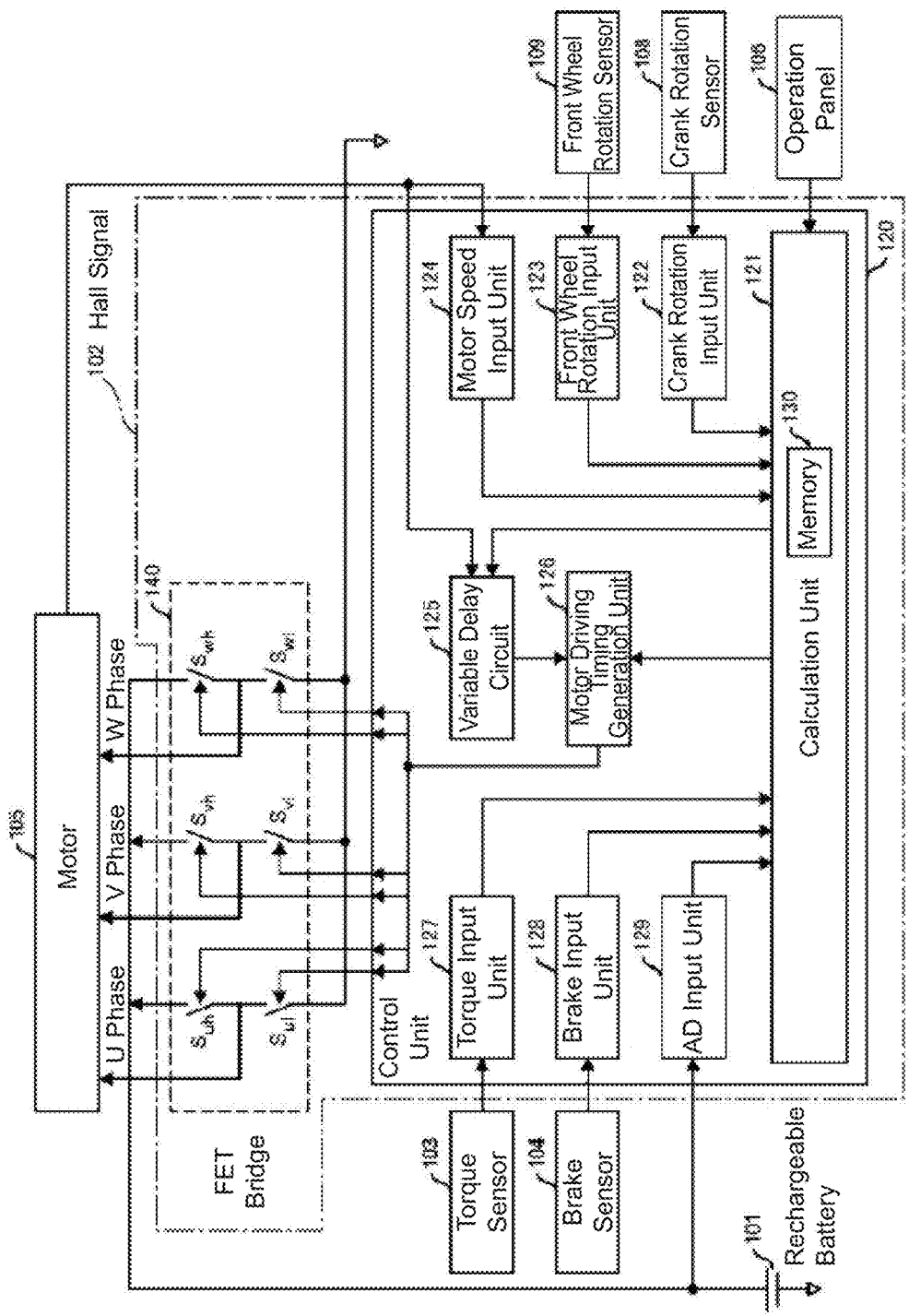
FIG. 2 is a block diagram showing a controller of the present embodiment.

The configuration of the controller 102 will be described with reference to FIG. 2. FIG. 2 is a block diagram showing the controller 102. As shown in FIG. 2, the controller 102 has a control unit 120 and an FET (field effect transistor) bridge 140.

(FET Bridge)

The FET bridge 140 is a bridge circuit that functions as an inverter for supplying direct current from the rechargeable battery 101 to the winding of the motor 105 and has six switches corresponding to the U-phase, V-phase, and W-phase of the motor 105. Specifically, the FET bridge 140 includes a high-side FET ($S_{uh}$) and low-side FET ($S_{ul}$) that perform U-phase switching for the motor 105, a high-side FET ($S_{vh}$) and low-side FET ($S_{vl}$) that perform V-phase switching for the motor 105, and a high-side FET ($S_{wh}$) and low-side FET ($S_{wl}$) that perform W-phase switching for the motor 105. This FET bridge 140 forms part of a complementary switching amp. In the present embodiment, PWM (pulse width modulation) control is used to turn ON and OFF the switching devices included in the FET bridge 140 described above.

(Control Unit)

The control unit 120 drives the operation of the motor 105 in accordance with output signals from the various types of sensors described above. The control unit 120 has a calculation unit 121, a crank rotation input unit 122 (crank rotation detection unit), a front-wheel rotation input unit 123 (wheel rotation detection unit), a motor speed input unit 124, a variable delay circuit 125, a motor driving timing generation unit 126, a torque input unit 127, a brake input unit 128, and an AD input unit 129.

The calculation unit 121 receives output signals from the operation panel 106, crank rotation input unit 122, front-wheel rotation input unit 123, motor speed input unit 124, torque input unit 126, brake input unit 128, and AD input unit 129, performs the calculations described below, and then outputs instruction signals to the motor driving timing generation unit 126 and the variable delay circuit 125. In the present embodiment, the calculation unit 121 has a memory 130 embedded therein for storing various types of data or data already being processed for calculations, but the memory 130 may alternatively be provided separately from the calculation unit 121. The calculation unit 121 may also be realized by the processor running a program, in which case this program would be stored in the memory 130.

The calculation unit 121 will be described in detail. The calculation unit 121 calculates a first value corresponding to the rotation of the wheel 18. Specifically, the front-wheel rotation sensor 109 detects the rotation of the wheel 18 and outputs a signal corresponding to the rotation of the wheel 18. When the front-wheel rotation input unit 123 receives the signal from the front-wheel rotation sensor 109, the front-wheel rotation input unit detects the rotation amount (rotation quantity) of the wheel 18 from the signal and outputs the result to the calculation unit 121. Then, as described later, the calculation unit 121 calculates the first value in accordance with the signal received from the front-wheel rotation input unit 123.

The first value corresponds to the rotation of the wheel 18 and is used to determine whether to cause the motor 105 to perform a regenerative operation. The first value may be contrastable with a second value (described later), such as the vehicle speed (hereinafter, "wheel speed") estimated from the rotation of the wheel 18, the riding distance (first distance) estimated from the rotation of the wheel 18, or a numerical value that is the rotation speed of the wheel 18 converted into the rotation speed of the crank 14. The method of calculating wheel speed and the first distance as one example of this type of first value will be described later.

Furthermore, the calculation unit 121 calculates a second value corresponding to the rotation of the crank 14. Specifically, the crank rotation sensor 108 detects the rotation of the crank 14 and outputs a signal corresponding to the rotation of the crank 14. When the crank rotation input unit 122 receives the signal from the crank rotation sensor 108, the crank rotation input unit 122 detects the rotation amount (rotation quantity) of the crank 14 from the signal and then outputs the result to the calculation unit 121. Then, as described later, the calculation unit 121 calculates the second value in accordance with the signal received from the crank rotation input unit 122.

The second value corresponds to the rotation of the crank 14 and is used along with the first value described above to determine whether regenerative operation of the motor 105 is necessary. The second value may be contrastable with the first value described above, such as the vehicle speed (hereinafter, "crank speed") estimated from the rotation of the crank 14, the riding distance (second distance) estimated from the rotation of the crank 14, or a numerical value that is the rotation speed of the crank 14 converted into the rotation speed of the wheel 18. The method of calculating crank speed and the second distance as one example of this type of second value will be described later.

Furthermore, the calculation unit 121 calculates rotation speed of the motor 105, motor information, and the like in accordance with signals from the motor speed input unit 124. In the present embodiment, Hall elements (not shown) are used to detect the location of the magnetic poles of the rotors (not shown) of the motor 105. The Hall signals output from the Hall elements in accordance with the rotation of the rotors of the motor 105 are received by the motor speed input unit 124. The motor speed input unit 124 calculates the rotation amount of the motor 105 from the received Hall signals and outputs the result to the calculation unit 121. The calculation unit 121 then calculates motor information in accordance with the received signals from the motor speed input unit 124. The motor information is used for controlling operation of the motor and includes rotation speed of the motor 105, riding speed of the motor 105 estimated from the rotation amount (hereinafter, "motor speed"), and the like.

The calculation unit 121 also receives signals from the torque input unit 127, brake input unit 128, and AD (analog-digital) input unit 129. Specifically, the torque input unit 127 receives torque signals indicating the torque affecting the crank 14 from the torque sensor 103, and these torque signals are digitized and output to the calculation unit 121.

The calculation unit 121 uses these torque signals to determine whether regenerative charging by the motor 105 is necessary, for example.

Furthermore, the brake input unit 128 receives from the brake sensor 104 brake signals indicating braking force, which is based on the operation amount of the brake lever 20, and these brake signals are digitized and output to the calculation unit 121. The calculation unit 121 starts regenerative operation when this brake signal is received. The calculation unit 121 may be configured such that the braking force from regeneration can be adjusted by controlling the regenerative charging amount in accordance with the operation amount of the brake lever 20.

The AD input unit 129 measures the output voltage of the rechargeable battery 101 and outputs the measured voltage signal to the calculation unit 121. The calculation unit 121 controls the charging and discharging of the rechargeable battery 101 in accordance with the value of this voltage signal. In order to prevent damage to the rechargeable battery 101 by overcharging, control may be performed such that the rechargeable battery 101 stops charging at a prescribed maximum voltage, so that the voltage of the rechargeable battery 101 does not exceed this prescribed maximum voltage. Moreover, in order to prevent damage to the rechargeable battery 101 by overdischarging, control may be performed such that the rechargeable battery 101 stops discharging at a prescribed minimum voltage, so that the voltage of the rechargeable battery 101 does not fall below this prescribed minimum voltage.

The calculation unit 121 also receives operation signals from the operation panel 106. The operation panel 106 includes a display unit for displaying vehicle speed, battery power of the rechargeable battery 101, operation mode (described later), etc., and operation buttons for changing the operation mode, turning on or off the headlights, or the like. The operation mode indicates the degree of assistance and regenerative charging by electric motor-driven force, and a plurality of modes are configured as below, for example.

High Assist Mode: Prioritize assistance by electric motor-driven force;
Medium Assist Mode: Balance assistance and regenerative charging by electric motor-driven force;
Low Assist Mode: Increase regenerative charging opportunities;
OFF: Do not operate motor.

The calculation unit 121 performs calculations using the received various types of signals and outputs an advance angle value to the variable delay circuit 125 as the calculation result. The variable delay circuit 125 adjusts the phase of the Hall signal received from the Hall element of the motor 105 in accordance with the advance angle value received from the calculation unit 121 and outputs the adjusted Hall signal to the motor driving timing generation unit 126.

The calculation unit 121 also outputs a PWM code received as a result of the calculations, which corresponds to a PWM duty cycle, for example, to the motor driving timing generation unit 126. The motor driving timing generation unit 126 generates a switching signal in accordance with the adjusted Hall signal from the variable delay circuit 125 and the PWM code from the calculation unit 121, and then outputs the switching signal to the respective FETs in the FET bridge 140. The basic operation of the motor driving is described in the WO 2012/086459 pamphlet etc. and is not a primary part of the present embodiment, and thus a description thereof will be omitted.

(Wheel Speed and Crank Speed)

Wheel speed and crank speed will be described below. Wheel speed expresses the vehicle speed estimated from the rotation of the wheel 18 under the presumption that the power-assisted bicycle 1 is running in synchronization with the rotation of the wheel 18. In such a case, it is presumed that the wheel 18 does not idle due to slips or the like. As described above, the rotation speed of the wheel 18 is obtained from wheel rotation information from the front-wheel rotation input unit 123 and from Hall signals from the motor speed input unit 124 when a hub motor in which the wheel 18 and motor 105 are integrated is being used, as in the present embodiment; therefore, an estimation value of the vehicle speed can be calculated based on the rotation speed of the wheel 18 and the diameter of the wheel 18. This calculation of the wheel speed is performed in the calculation unit 121.

Furthermore, the crank speed expresses the vehicle speed estimated from the rotation of the crank 14. In a power-assisted bicycle 1 that drives the wheel 19 via rotation of the crank 14, as in the present embodiment, presuming a state in which the crank 14 and the wheel 19 are linked in operation, it is possible to calculate the estimation value of the vehicle speed based on the rotation speed of the crank 14 and the gear ratio (described later). This calculation of the crank speed is performed in the calculation unit 121.

The gear ratio can be calculated from the proportion of the rotation speed of the wheel 19 described above to the rotation speed of the crank 14 based on the output signal of the crank rotation input 122. This calculation of the gear ratio is performed in the calculation unit 121. Alternatively, the necessary information may be obtained from a specialized transmission that can detect the gear ratio.

(Operation of Controller)

Figure 3:
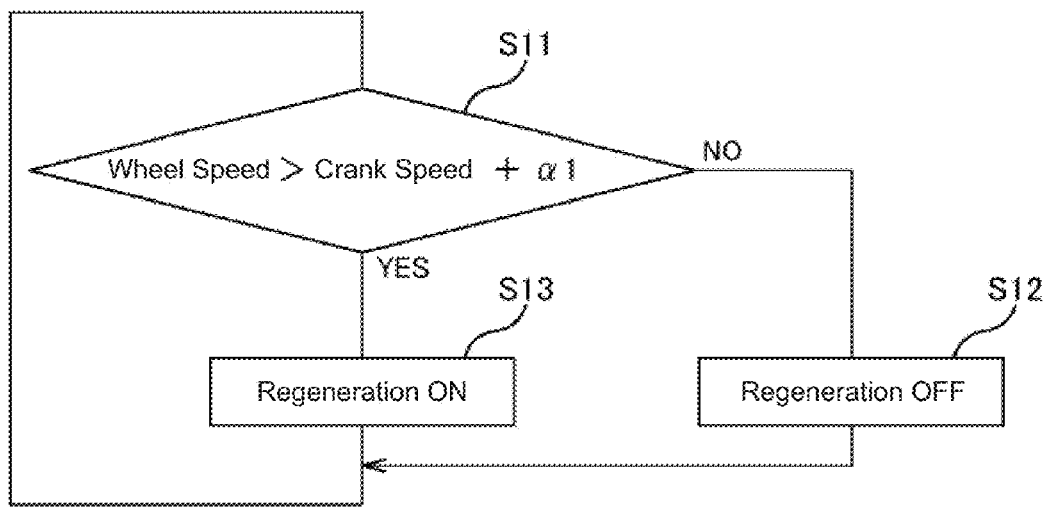
FIG. 3 is a flowchart showing an example of regenerative control flow in the present embodiment.

The operation of the controller 102, and in particular the regenerative control process of the motor 105, will be described below with reference to FIG. 3. FIG. 3 is a flow chart showing one example of the regenerative control flow.

(Determination of Regenerative Operation)

As shown in FIG. 3, in the present embodiment, it is repeatedly determined whether to perform regenerative operation of the motor 105. This determination is performed in the calculation unit 121. Specifically, in step S11, after the wheel speed and crank speed have been calculated in accordance with the wheel rotation information from the front-wheel rotation input unit 123 and the crank rotation information from the crank rotation input unit 122, it is determined whether Formula 1 below is satisfied.

$$\text{Wheel speed} > \text{crank speed} + \alpha 1, \quad \alpha 1 \geq 0 \quad \text{(Formula 1)}$$

Here, constant α1 indicates a margin between the occurrence of a speed differential between wheel speed and crank speed and the start (turning ON) of regenerative operation, and is set at 0 or higher. The higher that constant α1 is, the harder it will be for regenerative operation of the motor 105 to turn ON.

Alternatively, Formula 1' below may be used instead of Formula 1 above.

$$\text{Wheel speed}/\text{crank speed} > +\alpha 2, \quad \alpha 2 \geq 1 \quad \text{(Formula 1')}$$

Here, constant α2 indicates a margin between the occurrence of a speed differential between wheel speed and crank speed and the start (turning ON) of regenerative operation, and is set at 1 or higher. The higher that constant α2 is, the harder it will be for regenerative operation of the motor 105 to turn ON.

In any case, if it is determined that Formula 1 or Formula 1' has not been satisfied in step S11, then regenerative operation of the motor 105 is stopped in S12. On the other hand, if it is determined that Formula 1 or Formula 1' has been satisfied in step S11, then regenerative operation of the motor 105 is turned ON in step S13. Thus, both cases determine whether to perform regeneration charging by the motor, based on a relative difference between the first value (e.g., the wheel speed) and the second value (e.g., the crank speed); a differential amount between the two values is used as the relative difference in Formula 1 and the ratio of the first value to the second value is used as the relative difference in Formula 1'.

Adjusting the constant such as α1 or α2 in this manner as necessary makes it possible to immediately turn ON regenerative operation when a slight speed differential occurs between wheel speed and crank speed, and also makes it possible to turn ON regenerative operation when an obvious speed differential has occurred. It is also possible to have a configuration in which, when regenerative control is performed, the greater the speed differential between wheel speed and crank speed, the greater the regeneration amount will be.

(Relationship between Vehicle Riding State and Motor Operation)

The relationship between the riding state of the power-assisted bicycle 1 and the operation of the motor 105 will be described below with reference to FIGS. 4 and 5. FIGS. 4 and 5 are charts showing examples of the relationship between the riding state of the power-assisted bicycle 1 and the operation of the motor 105. In FIGS. 4 and 5, "regeneration determination based on rotation amount of crank (comparison example)," which is compared to the regeneration determination of the present embodiment, indicates a method of regeneration determination whereby one standard for determination is the rotation amount of the crank being below a prescribed rotation amount (e.g., 6 km/h if converted to crank speed), or namely, the crank 14 not actually moving. The "driving operation" of the motor 105 in the present embodiment and comparison example is performed under parameters using the same vehicle speed, the same crank speed, and the same crank torque.

Specifically, in FIGS. 4 and 5, the riding state of the power-assisted bicycle 1 is categorized into six aspects from case 1 to case 6 based on differences in three elements: vehicle speed, crank speed, and crank torque, and it is shown whether regeneration and driving operation is performed or not performed in each case. In case 1 to case 3, constant α1 of Formula 1 (described above), which is a formula for determination of regenerative operation, is set to 3 km/h, for example, and in case 4 to case 6, constant α1 is set to 6 km/h, for example.

In case 1, wheel speed is 20 km/h, crank speed is 20 km/h, and crank torque is 10 Nm, and the power-assisted bicycle 1 is either accelerating after taking off or cruising using the pedal force of the rider. In this state, driving operation of the motor 105 is performed, and regenerative operation is not performed in either the comparison example or present embodiment.

In case 2, wheel speed is 20 km/h, crank speed is 15 km/h, and crank torque is 0 Nm, and the power-assisted bicycle 1 is coasting. In this state, driving operation of the motor 105 is stopped. Furthermore, regenerative operation, while not performed in the comparison example, is performed in the present embodiment due to Formula 1 (described above) being satisfied. Case 2 indicates a state typical to the moment right after the power-assisted bicycle 1 transitions from cruising to coasting, or when starting to descend a slope, for example, and the present embodiment uses this type of state as an opportunity for regenerative charging and performs regenerative operation.

In case 3, wheel speed is 20 km/h, crank speed is 5 km/h, and crank torque is 0Nm, and the power-assisted bicycle 1 is coasting in a state in which the rotation of the crank 14 is almost stopped. In this state, driving operation of the motor 105 is stopped, and regenerative operation is performed in both the comparison example and the present embodiment.

In case 4, wheel speed is 30 km/h, crank speed is 30 km/h, and crank torque is 10 Nm, and the vehicle is cruising by the pedal force of the rider. In this state, driving operation of the motor 105 is stopped, and regenerative operation is not performed in either the comparison example or the present embodiment.

In case 5, wheel speed is 30 km/h, crank speed is 20 km/h, and crank torque is 0 Nm, and the power-assisted bicycle 1 is transitioning to coasting. Accordingly, in this case, in a similar manner to case 2, the driving operation of the motor 105 is stopped. Regenerative operation, while not performed in the comparison example, is performed in the present embodiment due to Formula 1 (described above) being satisfied. In the present embodiment, regenerative charging starts when the crank 14 is still rotating comparatively fast, which increases the opportunities for obtaining a large amount of regenerated power.

In case 6, wheel speed is 30 km/h, crank speed is 24 km/h, and crank torque is 0 Nm, with the crank 14 rotating more than in case 5, but the power-assisted bicycle 1 is coasting. In this case, in a similar manner to case 5, driving operation of the motor 105 is stopped, and while regenerative operation is not performed in the comparison example, it is performed in the present embodiment due to Formula 1 (described above) being satisfied. However, in case 5 and case 6, the motor 105 may be adjusted such that the faster crank speed is, the smaller the regeneration amount is. The crank speed being fast suggests that the intention of the rider is to accelerate, and thus it is preferable to suppress the regenerative braking force that follows regenerative operation.

(Relationship between Riding States and Regenerative Charging)

Figure 6:
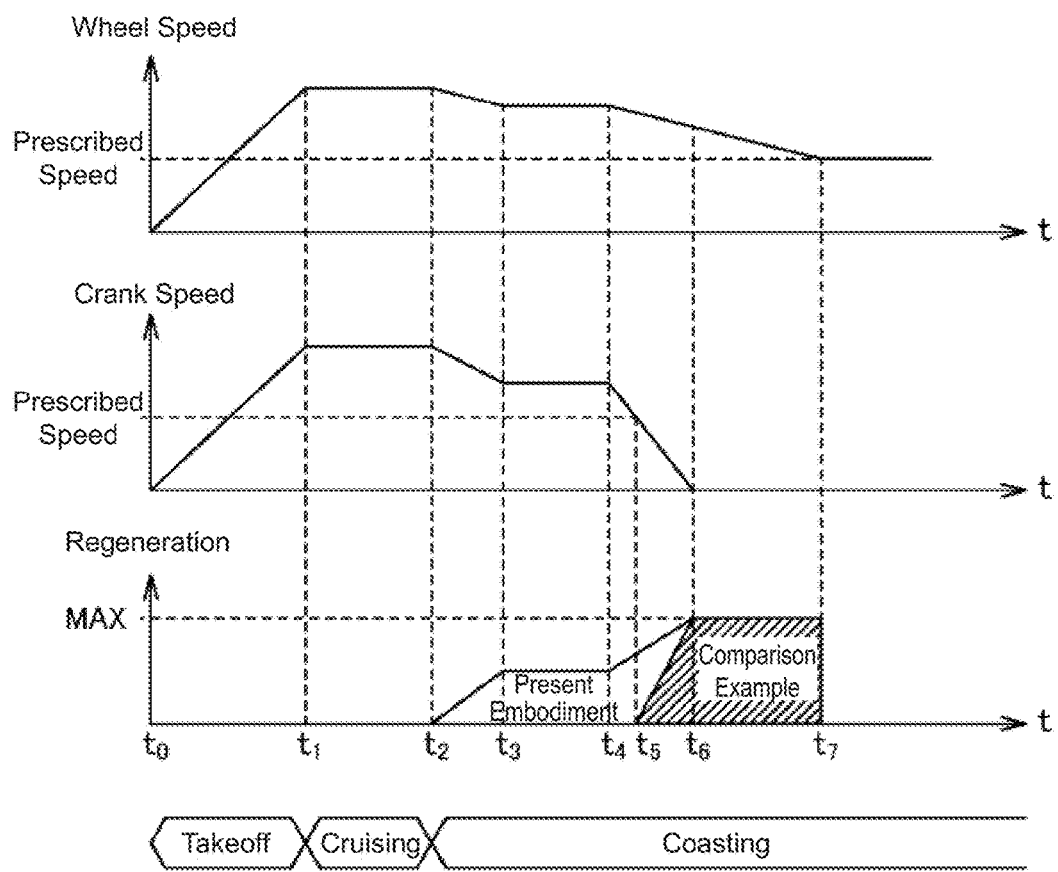
FIG. 6 is a view of an example of the relationship between riding states of a vehicle and regenerative charging in the present embodiment.

Regenerative charging will be described in a series of riding states of the power-assisted bicycle 1 from taking off to coasting with reference to FIG. 6. FIG. 6 is a graph showing an example of the relationship between the riding states of the power-assisted bicycle 1 and the regenerative charging of the motor 105. In FIG. 6, "comparison example" refers to the "regeneration determination based on rotation amount of the crank (comparison example)" compared to the regeneration determination in the present embodiment in FIGS. 4 and 5. Furthermore, the regenerative charging amount in FIG. 6 increases as the crank speed decreases and is at maximum when the crank speed is equal to 0. Thus, in this embodiment, the regeneration amount of the electric motor is varied in accordance with the crank speed. In other words, the detected crank speed is used as the control parameter for determining the regeneration amount.

In FIG. 6, the power-assisted bicycle 1 takes off and accelerates at time t0, transitions to cruising at a set speed at time t1, transitions to coasting at time t2, and then reduces riding speed to a prescribed speed (e.g., 3 km/h) at time t7. From time t0 to time t2, regenerative charging is not performed in either the present embodiment or the comparison example. Regenerative charging is performed during the coasting that starts from time t2, but the start time of regenerative charging is sooner in the present embodiment than in the comparison example.

Specifically, regenerative charging in the present embodiment starts at time t2 when the speed differential of constant α1 occurs between wheel speed and crank speed, and increases as crank speed decreases. Thereafter, at time t6 when crank speed has dropped to 0, the regenerative charging amount is at maximum, and regenerative operation is performed at this maximum regenerative charging amount until time t7 when the wheel speed drops to a prescribed speed. On the other hand, the regenerative charging in the comparison example starts at time t5 when the crank speed has dropped to a prescribed speed, and the regenerative charging amount is at maximum at time t6, with regenerative operation being performed at this maximum regenerative charging amount until time t7. After time t7, regenerative operation is not performed in either the present embodiment or the comparison example.

The amount of power generated in the processes of the riding states in FIG. 6 is equal to the areas surrounded by the respective curved lines and time axes indicating the regenerative charging amount in the present embodiment and comparison example. Accordingly, the regenerative charging of the present embodiment regenerates a greater amount of power than the comparison example in an amount equal to the difference in these areas. This type of result is due to the present embodiment increasing the opportunities for regeneration, as shown in case 2, case 5, and case 6 described above.

(Adjusting Regenerative Charging Amount)

Figure 7:
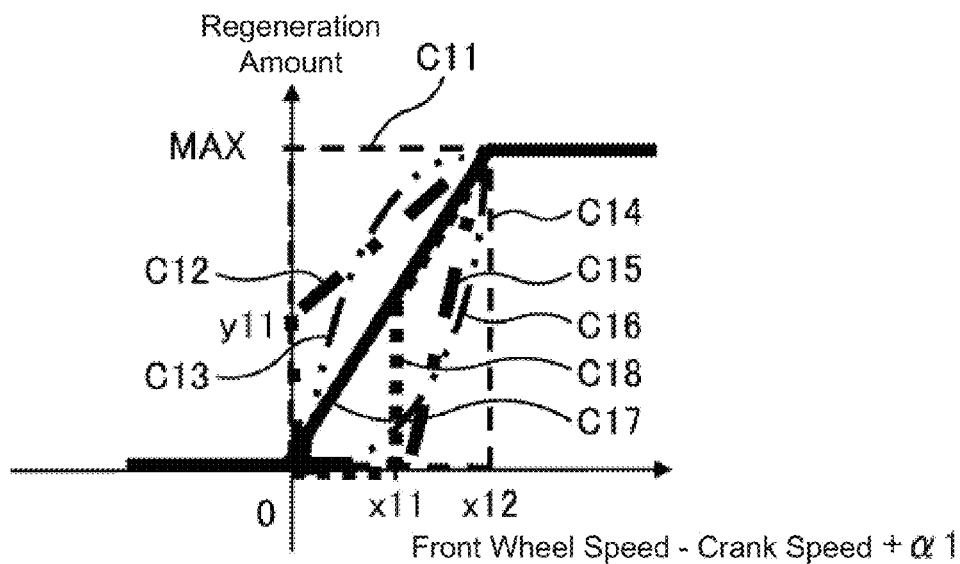
FIG. 7 is a graph showing an example of the relationship between regenerative charge amount and the speed differential between wheel speed and crank speed in the present embodiment.
Figure 8:
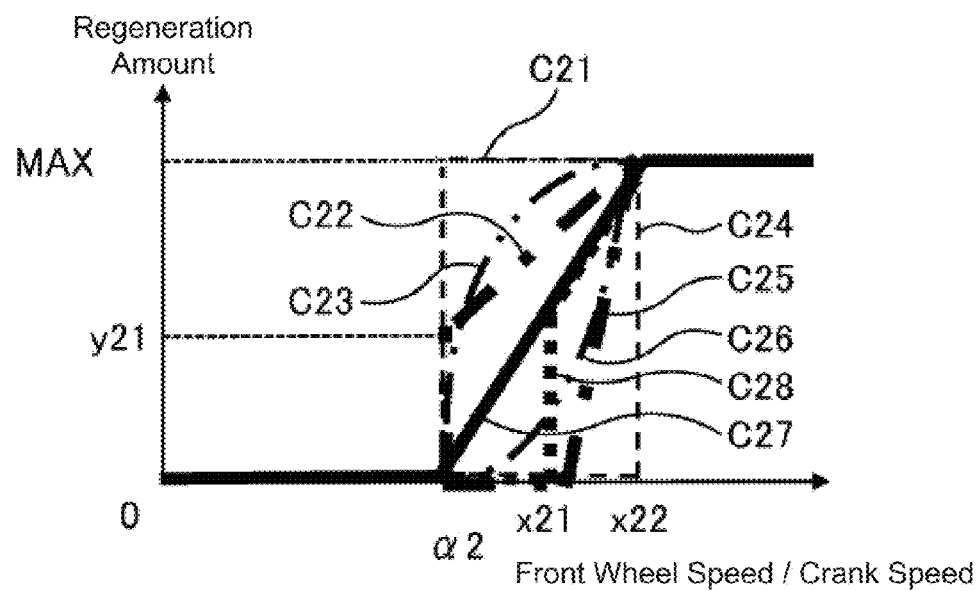
FIG. 8 is a graph showing an example of the relationship between regenerative charge amount and the proportion of wheel speed with respect to crank speed.

A method of adjusting the regenerative charging amount will be described with reference to FIGS. 7 and 8. FIG. 7 is a graph showing an example of a relationship between the regenerative charging amount and a value in which constant α1 of Formula 1 has been added to the speed differential between vehicle speed and crank speed. FIG. 8 is a graph showing an example of the relationship between regenerative charge amount and the proportion of wheel speed with respect to crank speed. As shown in the drawings, in both cases, the regeneration amount of the electric motor—i.e., the regenerative charging amount of the storage device—is varied in accordance with the magnitude of the relative difference between the vehicle speed and the crank speed. Thus, in these embodiments, the control parameter/information that determines the regeneration amount is this magnitude of the relative difference between the vehicle speed and the crank speed (beyond a prescribed value, such as α1, α2).

Specifically, the characteristic line C11 in FIG. 7 shows the motor 105 being controlled so as to perform regenerative charging at the maximum regeneration amount when the determination conditions given in Formula 1 (described above) are satisfied. Therefore, regeneration frequency is greatest with respect to characteristic lines C12 to C18 described below, and the regeneration amount can be increased. Control of the motor 105 according to characteristic line C21 in FIG. 8 can obtain similar effects.

Furthermore, with characteristic line C12 in FIG. 7, when the determination conditions given in Formula 1 (described above) are satisfied, regenerative charging starts from a prescribed regeneration amount y11 (>0). The regeneration amount is then increased proportionally to the speed differential and regenerative charging is performed at the prescribed maximum regeneration amount when the speed differential is at least ×12 the prescribed speed differential. Thus, with the characteristic line C12, regeneration frequency is the highest after characteristic line C11. Due to the regenerative braking force greatly increasing following the regeneration amount, the discomfort of the rider during the start of regeneration is less than with characteristic line C11, and riding comfort is better. Control of the motor 105 according to characteristic line C22 in FIG. 8 can obtain similar effects.

With characteristic line C13 shown in FIG. 7, when the determination conditions given in Formula 1 (described above) are satisfied, the amount of change in the regeneration amount increases so as to become smaller following the speed differential. This is close in effect to characteristic line C12, but there is less rapid change in the regeneration amount compared to characteristic line C12, and accordingly less rapid change of regenerative braking force, which results in less discomfort than characteristic line C12. Control of the motor 105 according to characteristic line C23 in FIG. 8 can obtain similar effects.

With characteristic line C14 in FIG. 7, even if the determination conditions given in Formula 1 (described above) are satisfied, regenerative operation does not immediately start, but instead regenerative charging is performed at the prescribed maximum regeneration amount when the prescribed speed differential×12(>×11) has been reached. Among the control examples in FIG. 7, this has the lowest regeneration frequency, and accordingly the lowest frequency of regenerative braking force, which results in little effect on riding performance. Control of the motor 105 according to characteristic line C24 in FIG. 8 can obtain similar effects.

With characteristic line C15 in FIG. 7, even if the determination conditions given in Formula 1 (described above) are satisfied, regeneration does not immediately start. Rather, regenerative charging starts after a certain prescribed speed differential×11(>0) is achieved. Thus, this has the lowest regeneration frequency after characteristic line C14. Moreover, the regeneration amount slowly increases after the start of regeneration, and thus there is less discomfort for the rider during the start of regeneration as compared to characteristic line C14, and riding comfort is better. Control of the motor 105 according to characteristic line C25 in FIG. 8 can obtain similar effects.

With characteristic line C16 in FIG. 7, when the determination conditions given in Formula 1 (described above) are satisfied, the amount of change in the regeneration amount increases so as to become greater (e.g., like an n function; n>1) with the speed differential. When the speed differential is small, the regeneration amount is small. This is close in effect to characteristic line C15, but there is less rapid change in the regeneration amount compared to characteristic line C15, and accordingly less rapid change of regenerative braking force, which results in less discomfort than characteristic line C15. Control of the motor 105 according to characteristic line C26 in FIG. 8 can obtain similar effects.

With characteristic line C17 in FIG. 7, when the determination conditions given in Formula 1 (described above) are satisfied, the regeneration amount increases so as to become greater in proportion to the speed differential. The proportional constant in characteristic line C17, or namely the slope of C17, can be set to any number. Among characteristic lines C11 to C16 described above, the control according to characteristic line C17 is the most intermediate in terms of balance between regeneration amount and riding characteristics. Control of the motor 105 according to characteristic line C27 in FIG. 8 can obtain similar effects.

Furthermore, characteristic line C18 in FIG. 7 does not start regenerative charging unless the speed differential becomes greater than prescribed speed×11, and thus regeneration frequency is less as compared to characteristic line C17. After regeneration has started, regenerative charging starts from a prescribed regeneration amount y11, and thus this is close in effect to characteristic line C15, but the regeneration amount is greater than characteristic line C15. Control of the motor 105 according to characteristic line C28 in FIG. 8 can obtain similar effects.

In this manner, control according to characteristic lines C11 to C13 in FIG. 7 and characteristic lines C23 to C23 in FIG. 8 has the advantages of making it possible to have high regeneration frequency and high regeneration amount. Accordingly, control based on these characteristic lines is suitable for riders who wish to extend the amount that can be ridden on a single charge of the rechargeable battery 101 or riders who are concerned about environmental issues. Furthermore, the feature of control according to characteristic lines C14 to C16 and C18 in FIG. 7 and characteristic lines C24 to C26 and C28 in FIG. 8 is that there is little effect on riding characteristics due to regeneration frequency being low and regeneration amount being low. Accordingly, this control can be said to be a method of control that is suitable for riders who prioritize riding comfort. Control according to characteristic line C17 in FIG. 7 and characteristic line C27 in FIG. 8 excel at a balance between regeneration amount and riding characteristics, as described above. By providing these types of regenerative patterns with different characteristics, it is possible to realize regenerative control that corresponds to the wishes of the rider or the riding state.

As described above, in the present embodiment, the frequency of regenerative control increases, not based on braking operation of the rider, and even if special attention is not paid to regenerative operation while riding. Furthermore, it is possible to select any one of characteristic lines C11 to 18 and C21 to C28, whereby regenerative control is performed without causing discomfort to the rider. Moreover, it is also possible to adjust the regenerative charging amount by adjusting the pedaling state of the pedals 15. This results in an increase in the power that is recovered, which can improve the riding distance on a single charge. In addition, even if the capacity of the rechargeable battery 101 is reduced, it is possible to maintain riding distance and usage time, which enables a reduction in cost and miniaturization of the device.

MODIFICATION EXAMPLE 1

Figure 9:
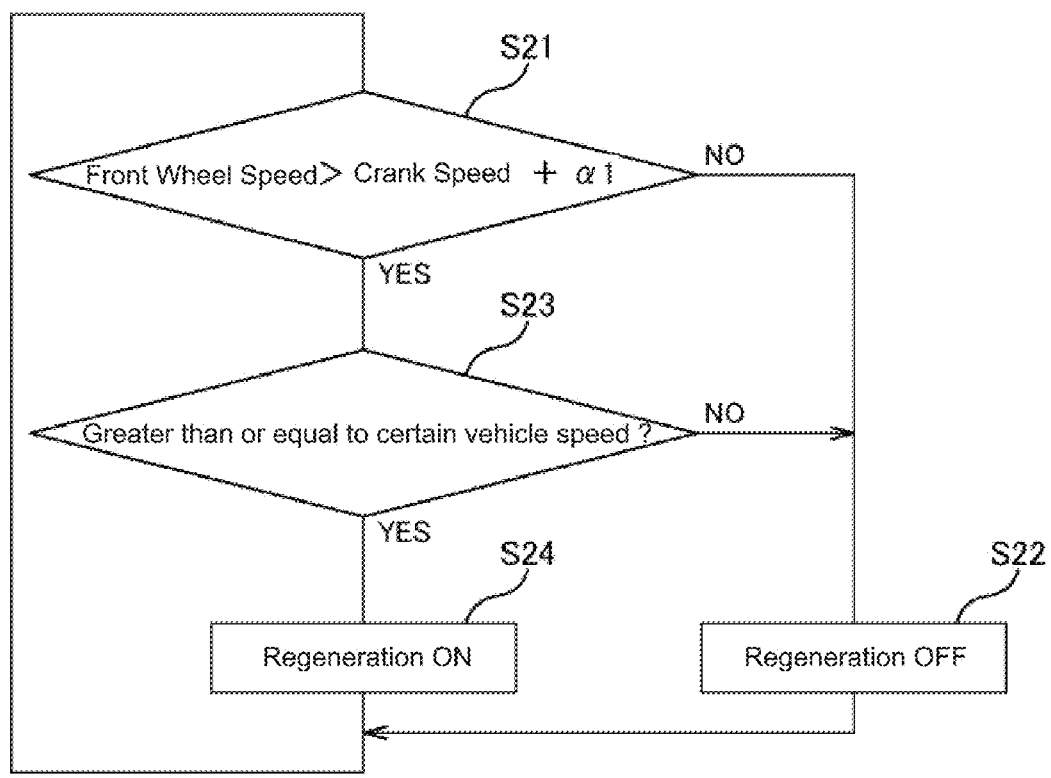
FIG. 9 is a flowchart showing an example of regenerative control flow in Modification Example 1.

Modification Example 1 of the present embodiment will be described with reference to FIG. 9. FIG. 9 is a flowchart showing an example of regenerative control flow in Modification Example 1. The differences between Modification Example 1 and the embodiment described above are in the flow of regenerative control. Accordingly, below is mainly a description of the flow of regenerative control.

In step S21 it is determined whether Formula 1 (described above) has been satisfied, and if Formula 1 has not been satisfied, regenerative operation stops in S22; this is similar to steps S11 and S12 in the embodiment described above. If Formula 1 (described above) is satisfied, then in step S23 it is determined whether the vehicle speed (e.g., wheel speed) is at least a prescribed speed. The "prescribed speed" is a low speed such as 3 km/h, for example. If vehicle speed is at least the prescribed speed, in step S24 the regenerative operation is performed, but if the vehicle speed is below the prescribed speed, step S22 is transitioned to and regenerative operation is stopped. These steps are performed repeatedly.

If regenerative operation is performed during low-speed riding, the regenerative braking force will reduce the speed of the power-assisted bicycle 1, and micro-adjustments to the stop location will be hard to make when the power-assisted bicycle 1 is about to be stopped. In order to be able to stop via micro-adjustments during braking operation by the rider, control is performed such that regenerative operation is not executed at low-speed riding. Furthermore, when the rider is pushing the power-assisted bicycle 1 by hand, it is possible to avoid the regenerative braking force following regenerative operation from affecting the power-assisted bicycle 1.

MODIFICATION EXAMPLE 2

Figure 10:
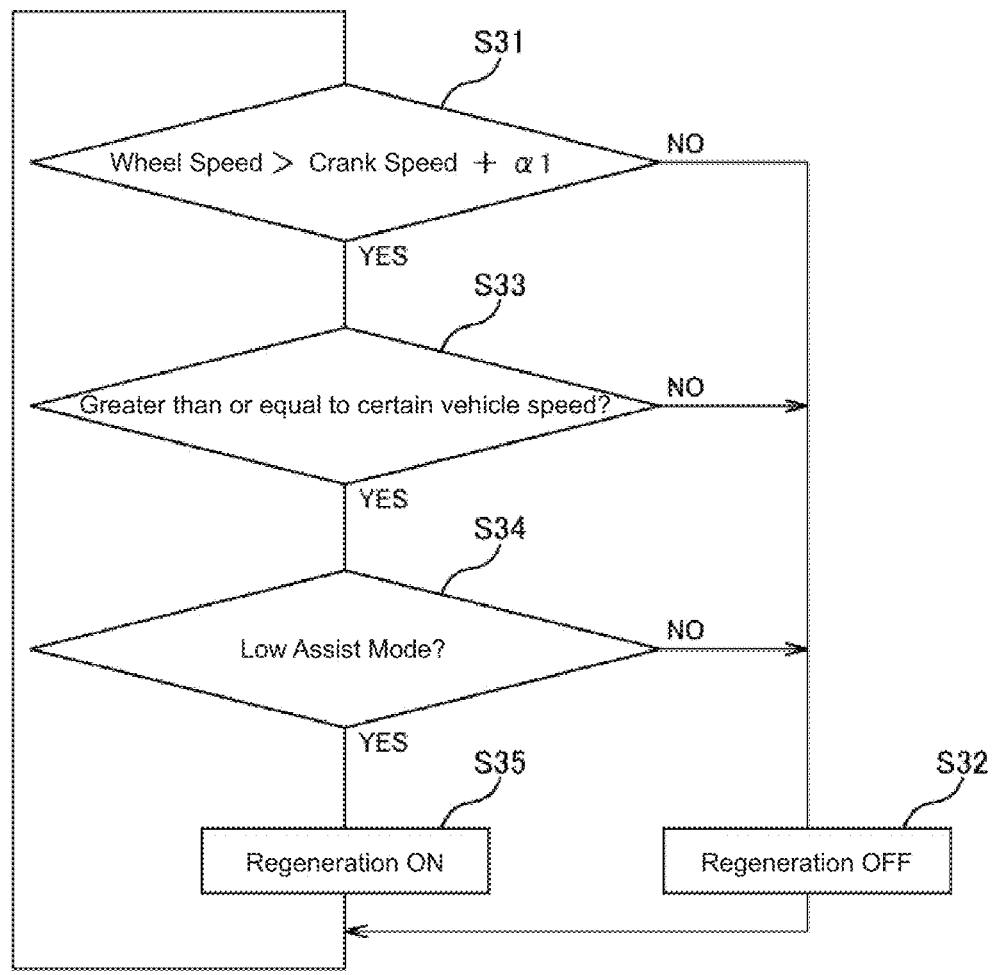
FIG. 10 is a flowchart showing an example of regenerative control flow in Modification Example 2.

Modification Example 2 of the present embodiment will be described with reference to FIG. 10. FIG. 10 is a flowchart showing an example of regenerative control flow in Modification Example 2. In a similar manner to Modification Example 1, Modification Example 2 differs from the present embodiment in the flow of regenerative control, and thus below is mainly a description of the flow of regenerative control.

In Modification Example 2, a determination for an assist mode (operation mode) is added to the flow of the regenerative control of Modification Example 1. Namely, Modification Example 2 is similar to Modification 1 in that, in step S31, it is determined if Formula 1 (described above) has been satisfied, and if Formula 1 has not been satisfied, then in step S32 regenerative operation is stopped, and if Formula 1 is satisfied, then in step S33 it is determined whether vehicle speed is at least a prescribed speed. Then, if the vehicle speed is at least the prescribed speed, in step S34 it is additionally determined whether a low assist mode (prescribed mode) has been set. If it is determined that the low assist mode has been set, regenerative operation is performed, but if it is determined that an operation mode other than low assist mode has been set, step S32 is transitioned to and regenerative operation is stopped. These steps are performed repeatedly.

Performing regenerative operation in this manner when the low assist mode (prescribed mode) is set makes it possible to have fine motor control based on the intentions of the rider. In this example, in step S34 it is determined whether a single specific assist mode has been set, but regenerative control may alternatively be performed when any one of a plurality of assist modes has been set. For example, regeneration may be performed when a low assist mode or medium assist mode desired by the rider in order to save power is selected.

MODIFICATION EXAMPLE 3

Figure 11:
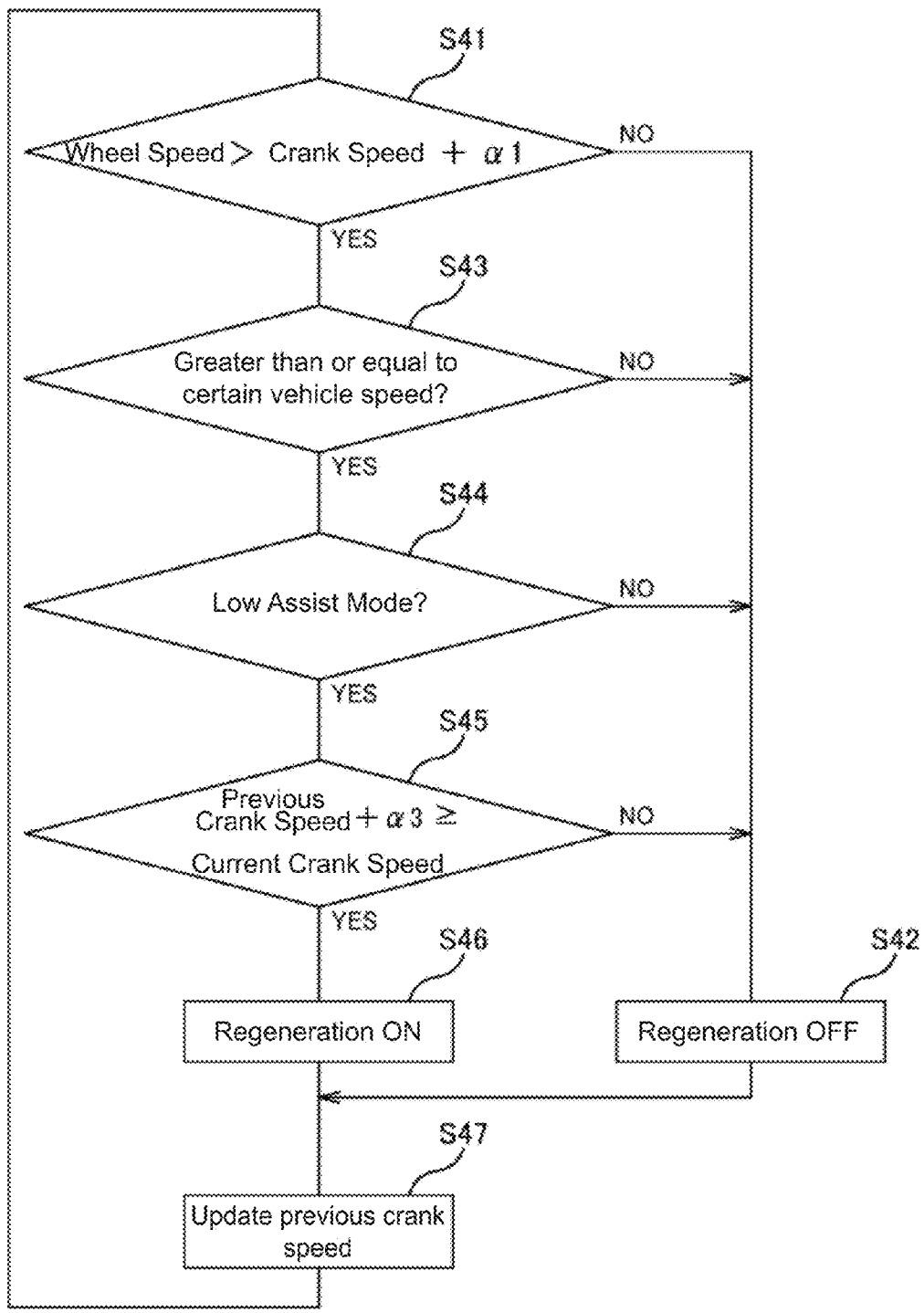
FIG. 11 is a flowchart showing an example of regenerative control flow in Modification Example 3.

Modification Example 3 of the present embodiment will be described with reference to FIG. 11. FIG. 11 is a flowchart showing an example of regenerative control flow in Modification Example 3. In a similar manner to Modification Example 1 and Modification Example 2, Modification Example 3 differs from the present embodiment in the flow of regenerative control, and thus below is mainly a description of the flow of regenerative control.

In Modification Example 3, a determination for Formula 2 (described later) is added to the flow of regenerative control of Modification Example 2. Namely, Modification Example 3 is similar to Modification 2 in that, in step S41, it is determined if Formula 1 (described above) has been satisfied, and if Formula 1 has not been satisfied, then in step S42 regenerative operation is stopped, and if Formula 1 is satisfied, then in step S43 it is determined whether vehicle speed is at least a prescribed speed, and if vehicle speed is at least the prescribed speed, then in step S44 it is determined whether a low assist mode (prescribed mode) has been set. Then, if it is determined that the low assist mode has been set, in step S45 determination is performed for Formula 2 below.

Previous crank speed+α3≥current crank speed, α3≥0    (Formula 2)

If it is determined that Formula 2 is satisfied, then in step S46 regenerative operation is performed, but if Formula 2 is not satisfied, then step S42 is transitioned to and regenerative operation is stopped. Then, in step S47 crank speed is renewed and the above-mentioned steps are repeatedly performed.

Setting constant α3 to an appropriate value makes it possible to stop regenerative operation if a change has occurred, such as an increase in crank speed. If Formula 2 has not been satisfied, or namely, if the new crank speed has increased, it means that the rider wishes to accelerate, and thus it is possible to perform regenerative control in line with the intentions of the rider by stopping regeneration.

MODIFICATION EXAMPLE 4

Figure 12:
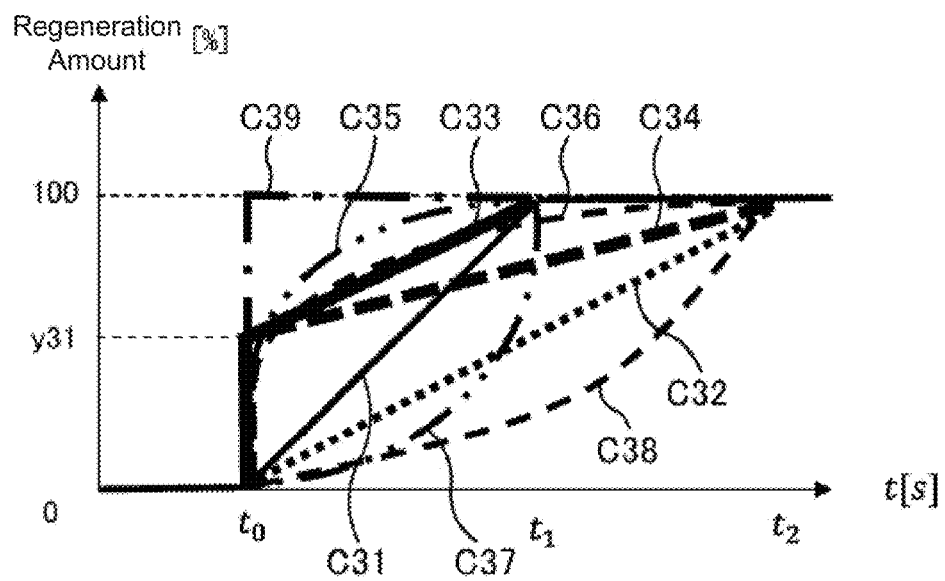
FIG. 12 is a graph showing an example of change in time of the regenerative charge amount varying Modification Example 4.
Figure 13:
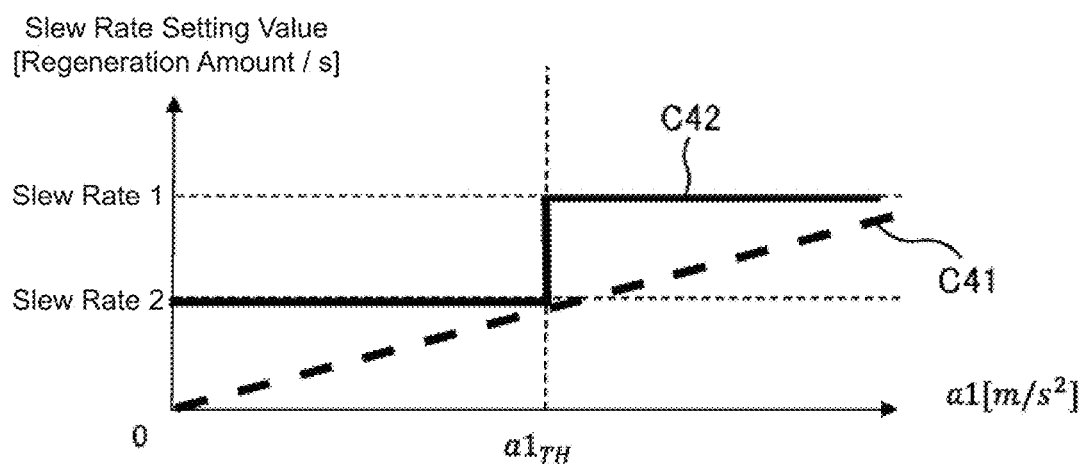
FIG. 13 is a graph showing an example of the relationship between regenerative charge amount per unit of time and change in time of the differential between wheel speed and crank speed in Modification Example 4.
Figure 14:
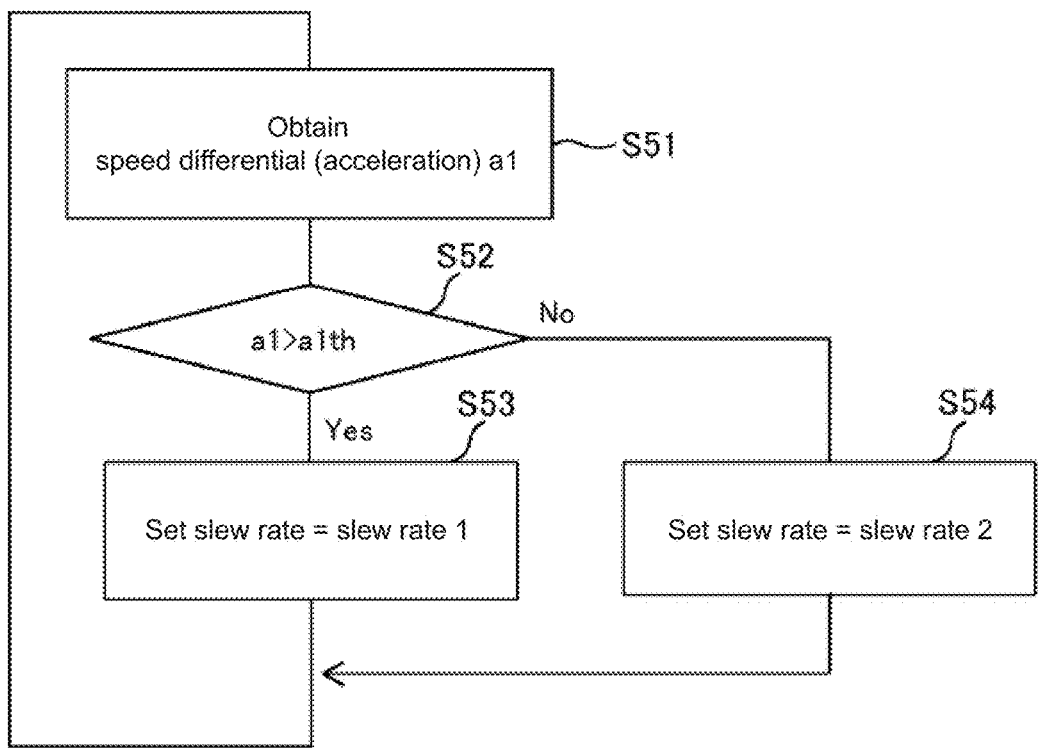
FIG. 14 is a flowchart showing an example of regenerative control flow in Modification Example 4.

Modification Example 4 of the present embodiment will be described with reference to FIGS. 12 to 14. FIG. 12 is a graph showing an example of regenerative charge amount varying with time in Modification Example 4. FIG. 13 is a graph showing an example of the relationship between regenerative charge amount per unit of time and change in time of the differential between wheel speed and crank speed in Modification Example 4. FIG. 14 is a flowchart showing an example of regenerative control flow in Modification Example 4. In Modification Example 4, the concept of slew rate is introduced in order to suppress rapid deceleration caused by regenerative braking force. Slew rate here is defined as the rate at which regenerative charge amount can change per unit time. Below is mainly a description of slew rate.

When the rider suddenly stops pedaling the pedals 15, regenerative control will start abruptly, which may cause a sense of rapid deceleration, for example. As a countermeasure, in Modification Example 4, a slew rate is set for when regenerative control is performed, and the setting value of the slew rate is adjusted in accordance with the change in time of the differential between wheel speed and crank speed, thereby softening the shock from regenerative braking. It is possible to set a slew rate for the regeneration amounts chosen in characteristic lines C11 to C18 in FIG. 7 and characteristic lines C21 to C28 in FIG. 8 described above, for example. The slew rate may be used as merely a prescribed setting value, or may be selected from a plurality of setting values. Setting a plurality of slew rates makes it possible to perform regenerative control that is appropriate for the behavior of the rider, which can improve the feeling of the ride.

(Examples of Slew Rate)

Examples of the slew rate will be described with reference to FIG. 12. In FIG. 12, the horizontal axis is time t and the vertical axis is regeneration amount per unit of time (slew rate), and characteristic lines C31 to C39 show eight different examples of slew rate. Characteristic lines C31 to C34 will be described in order below.

Characteristic lines C31 and C32 are similar in that both change proportionally to time t from 0% to 100% of the slew rate setting value. However, these characteristic lines differ in the time it takes to reach the maximum regeneration amount from time t0, with characteristic line C31 reaching the maximum regeneration amount at time t1 and characteristic line C32 at time t2. Since t1<t2, it takes longer for characteristic line C32 to reach a regeneration amount of 100% than it does for characteristic line C31. In other words, characteristic line C31 exhibits more rapid changes in regeneration amount than characteristic line C32. This rapid change in regeneration amount leads to a large regeneration amount and braking force in a short amount of time, and thus characteristic line C31 is appropriate for riders who prefer these types of characteristics. On the other hand, with characteristic line C32, which has less change in regeneration amount than characteristic line C31, there can be less discomfort caused by regenerative braking force.

Alternatively, a prescribed offset can be configured as with characteristic lines C33 and C34. Namely, with characteristic lines C33 and C34, after the regeneration amount increases from 0% to y31% [0<y31<100] at time t0, the regeneration amount increases proportionally to time t, and reaches the maximum regeneration amount at time t1 or time t2 (>t1). In this manner, with characteristic lines C33 and C34, control with a higher regeneration amount is performed from the start, which is appropriate for riders who wish to achieve strong regeneration amount and braking force quickly. Furthermore, the time it takes for characteristic line C34 to reach a regeneration amount of 100% is longer than it takes characteristic line C33, and thus in a similar manner to the relationship of characteristic lines C31 and C32, characteristic line C33 can be used when emphasizing regeneration amount and braking force, whereas characteristic line C34 can be used when emphasizing a reduction in discomfort to the rider.

Next, characteristic lines C35 and C36 will be described. With characteristic lines C33 and C34, the regeneration amount increases linearly after a prescribed offset, but characteristic lines C35 and C36 do not have an offset for the regeneration amount and instead increase in a curve or a non-linear manner. Accordingly, characteristic lines C35 and C36 have relatively less change than characteristic lines C33 and C34 in the braking force during increase of the regeneration amount, and thus can improve the feel of the ride. The difference between characteristic lines C35 and C36 is the time t1 and t2 (t1<t2) it takes to reach the maximum regeneration amount, and in a similar manner to the relationship between characteristic lines C31 and C32, characteristic line C35 can be used when emphasizing regeneration amount and braking force, and characteristic line C36 can be used when emphasizing a reduction in discomfort to the rider.

With characteristic lines C37 and C8, the regeneration amount increases in a curve, similar to characteristic lines C35 and C36. However, with characteristic lines C37 and C38, the rate of increase of the regeneration amount at the start of regeneration is relatively low, with the regeneration amount greatly increasing over time. Accordingly, using characteristic lines C37 and C38 can further smooth the change in braking.

Characteristic line C39 is an operation essentially without a slew rate. In such a case, it is possible to achieve the most rapid regeneration amount and braking force.

In this manner, it is possible to use various slew rates such as ones that are linear, curved, offset, or the like. The selection of which slew rate to set may be based on instructions by the rider, or as described later, may be performed as necessary by the calculation unit 121 in accordance with the riding state.

(Method of Selecting Slew Rate)

An example of the process for selecting a slew rate will be described with reference to FIGS. 13 and 14. In this example, during slew rate selection, a value (3rd value) a1 will be used as described below.

First, a calculation is performed of a differential Δv(Tire-Crank) between the differential v0(Tire-Crank) between wheel speed v0(Tire) and crank speed v0(Crank) at time t0 (e.g., current time) and the differential v1(Tire-Crank) between wheel speed v1(Tire) and crank speed v1(Crank) at time t1 ahead of time t0, and as shown in Formula 3 below, this speed differential Δv(Tire-Crank) is divided by time Δt (=t0−t1) to get the time differential and thereby calculate the value a1, which has an acceleration dimension.

$$a1=[\{v0(\text{Tire})-v0(\text{Crank})\}-\{v1(\text{Tire})-v1(\text{Crank})\}]/\Delta t=[v0(\text{Tire-Crank})-v1(\text{Tire-Crank})]]/\Delta t=\Delta v(\text{Tire-Crank})/\Delta t \quad \text{(Formula 3)}$$

Hereinafter, the value a1 having the acceleration dimension is sometimes referred to as the acceleration.

In the example of characteristic line C42 in FIG. 13, value a1 calculated as described above is compared to a pre-set threshold a1(th), and the slew rate is changed in a stepwise manner depending on whether value a1 is less than threshold a1(th) or greater than or equal to threshold a1(th). In other words, if value a1 is greater than or equal to threshold a1(th), slew rate 1 is selected, and if value a1 is less than threshold a1(th), slew rate 2, which has a slower rate of increase in regeneration amount than slew rate 1, is selected. A plurality of thresholds a1(th) may be set. Thus, the third value here, a1, is another example of the control parameter based on which the regeneration amount of the electric motor is determined through the slew rate (i.e., the rate of the increase of the regeneration amount).

When the slew rate is selected as described above, the process of the slew rate being selected progresses as shown in FIG. 14. In other words, in step S51, new value a1 calculated as described above is compared to threshold a1(th). If value a1 is greater than threshold a1(th), the process proceeds to step S52, and slew rate 1 is set. On the other hand, if value a1 is less than threshold a1(th), then in step S53 slew rate 2 is set. These steps S51 to S54 are performed when the new value a1 is calculated.

Alternatively, as shown by characteristic line C41 in FIG. 13, the slew rate can be set so as to increase proportionally with value a1.

(Examples of Slew Rate Selection Based on Riding Scenario)

Examples of slew rate selection based on different riding scenarios will be described. Threshold a1(th) is set to 2.45 m/s$^2$ (approximately 0.25 G) using characteristic line C42 in FIG. 13.

In the first riding scenario, a vehicle that was riding at a wheel speed of 15 km/h and a crank speed of 15 km/h has a wheel speed of 15 km/h and a crank speed of 0 km/h after one second. This scenario corresponds to when the crank rapidly decelerates during steady riding, with a high probability that the rider intends to decelerate. Accordingly, in this case, regenerative braking should be used early.

At such time, Δv(Tire-Crank)=15-0=km/h, Δt=1 s, a1≈4.17 m/s$^2$. Accordingly, a1≥a1(TH), and thus slew rate 1 is selected.

In the second riding scenario, a vehicle that is riding at a wheel speed of 15 km/h and a crank speed of 15 km/h has a wheel speed of 15 km/h and a crank speed of 10 km/h after one second. This scenario corresponds to when the crank gradually decelerates during steady riding, with the probability that the rider does not intend to decelerate. Accordingly, in this case, regenerative braking should be gradual.

At such time, Δv(Tire-Crank)=15−10=5 km/h, Δt=1 s, a1≈1.39 m/s². Accordingly, a1<a1(TH), and thus slew rate 2 is selected.

In this manner, when the crank is rapidly decelerated during steady riding, a slew rate that will quickly reach maximum is selected, and when the crank is gradually decelerated, a slew rate that will comparatively slowly reach maximum is selected.

In this manner it is possible to always choose the slew rate in accordance with the current value a1. Once the slew rate is selected, the slew rate may be continuously used until prescribed conditions are met. Once selected, the slew rate may be used until the regeneration amount reaches maximum, for example. Alternatively, once selected, the slew rate may be continuously used for a certain amount of time. By so doing, even if sudden changes in speed repeatedly occur due to riding on a bad road or the like, slew rate selection will not occur every time, and this can reduce discomfort and improve the feel of the ride, for example.

MODIFICATION EXAMPLE 5

Figure 15:
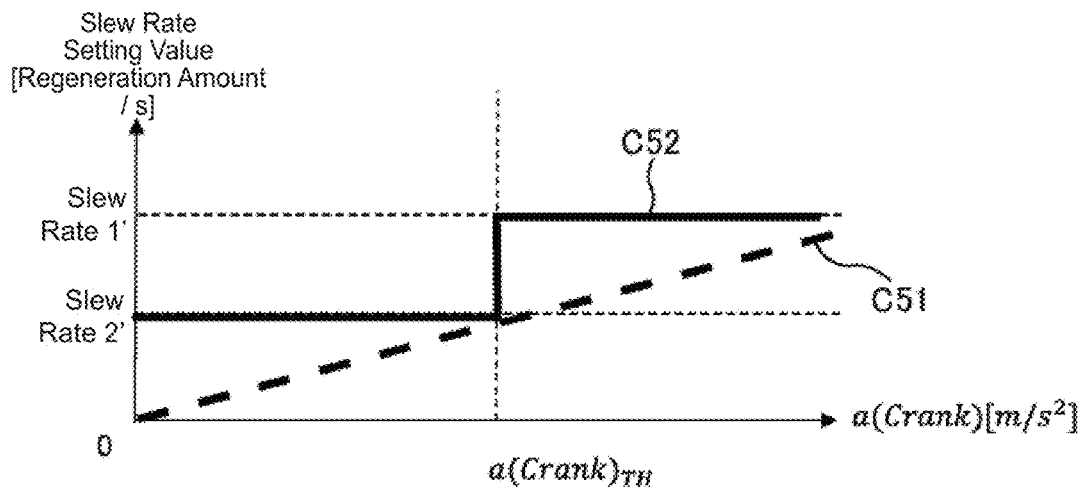
FIG. 15 is a graph showing an example of the relationship between regenerative charge amount per unit of time and change in time of the differential among crank speeds at differing times in Modification Example 5.
Figure 16:
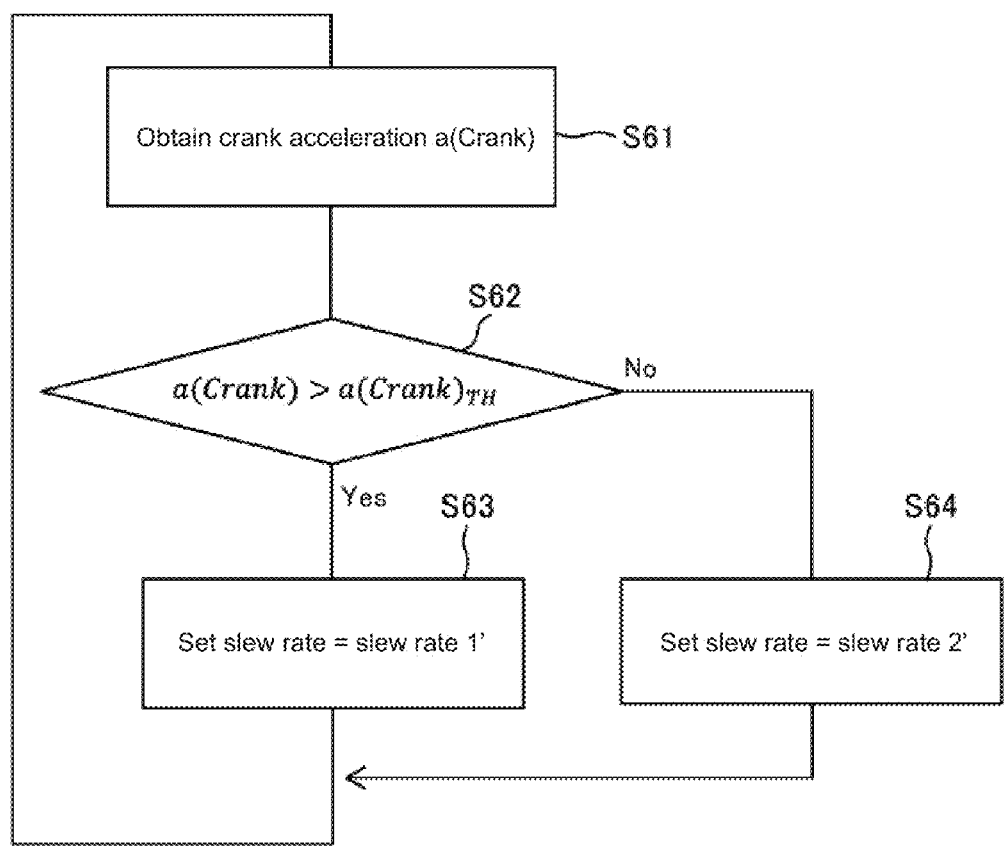
FIG. 16 is a flowchart showing an example of regenerative control flow in Modification Example 5.

Modification Example 5 of the present embodiment will be described with reference to FIGS. 15 to 16. FIG. 15 is a graph similar to FIG. 13 and shows an example of the relationship between regenerative charge amount per unit of time and change in time of the differential among crank speeds at differing times in Modification Example 5. FIG. 16 is a flowchart similar to FIG. 14 and shows regenerative control flow in Modification Example 5.

In a similar manner to Modification Example 4, in Modification Example 5 the regenerative charge amount per unit of time (slew rate) changes. However, Modification Example 5 differs from Modification Example 4 in that the selection of the slew rate is performed in accordance with the amount of change among crank speeds at differing times. Thus, the explanation below will mainly focus on this aspect.

In Modification Example 5, during slew rate selection, only crank speed is used, and wheel speed is not used. Specifically, crank speeds v0(Crank) and v1(Crank) at different times t0 and t1 (t0<t1) are used to find speed differential Δv(Crank), and then crank acceleration a(Crank) is found by dividing by time Δt (=t1−t0) (to get the time differential) as shown in Formula 4 below. This crank acceleration corresponds to a third value.

$$[v1(\text{Crank})-v0(\text{Crank})]/\Delta t = \Delta v(\text{Crank})/\Delta t = a(\text{Crank}) \quad \text{(Formula 4)}$$

Here, the threshold for slew rate selection is a(Crank)(TH). Thus, the third value here, a(Crank), is another example of the control parameter based on which the regeneration amount of the electric motor is determined through the slew rate (i.e., the rate of the increase of the regeneration amount).

In a similar manner to Modification Example 4, an example will be described where slew rate is selected based on a riding scenario. Characteristic line C52 in FIG. 15 is used to set threshold a(Crank)(TH) to 2.45 m² (approximately 0.25 G).

For the first riding scenario, the crank speed goes from 15 km/h to 0 km/h after one second; in other words, the crank 14 rapidly decelerates. At such time, crank acceleration a(Crank)≈4.17 m/s². Due to a(Crank)≥a(Crank)(TH), slew rate 1' is selected.

For the second riding scenario, the crank speed goes from 15 km/h to 1 km/h after one second; in other words, the crank 14 gradually decelerates. At such time, a(Crank)≈1.39 m/s². Due to a(Crank)<a(Crank)(TH), slew rate 2' is selected.

As above, in this manner in Modification Example 5, when the crank is rapidly decelerated during steady riding, a slew rate that will reach maximum quickly is selected, and when the crank is gradually decelerated, a slew rate that will reach maximum comparatively slowly is selected.

As above, in Modification Example 5, a plurality of slew rates can be selected. In such a case, the combination of selections may be changed depending on riding mode or the like of the power-assisted bicycle 1. When a low assist mode is set, for example, there is a possibility that the rider emphasizes riding that saves energy, and thus a slew rate may be set such that the rate of increase of the regeneration amount is high. As an example, the slew rates shown by characteristic lines C35 and C36 can be switched with crank acceleration a(Crank). Conversely, if a high assist mode is set, there is a possibility that the rider emphasizes riding performance, and thus a slew rate may be set such that the rate of increase of the regeneration amount is low. As an example, the slew rates shown by characteristic lines C37 and C38 can be switched with crank acceleration a(Crank).

As another example, the slew rate may be selected depending on the features or model of the vehicle. For example, with a vehicle having a large tire diameter, or a sports vehicle, riding performance may be emphasized, and for other vehicles, regenerative performance may be emphasized.

MODIFICATION EXAMPLE 6

Up to Modification Example 5, regenerative operation was controlled with a focus on at least the crank speed, but control may be performed with a focus on other relationships. Modification Example 6 uses the relationship between a riding distance (first distance) estimated from the rotation of the wheel 18 and a riding distance (second distance) estimated from the rotation of the crank 14. In other words, in Modification Example 6, a cumulative value based on rotation of the wheel 18 is compared to a cumulative value based on rotation of the crank 14, and regenerative operation is performed when the cumulative value based on the rotation of the wheel 18 is larger.

Specifically, while the pedal force of the rider is affecting the crank 14, the cumulative riding distance estimated from the rotation of the wheel 18 matches the cumulative riding distance estimated from the rotation of the crank 14. On the other hand, while the pedal force of the rider is not affecting the crank 14, the cumulative riding distance estimated from the rotation of the wheel 18 becomes greater than the cumulative value estimated from the rotation of the crank 14. Accordingly, in such a state, regeneration is performed.

The rotation information of the wheel 18 can be obtained from the front-wheel rotation sensor 109. Furthermore, the rotation information of the crank 14 can be obtained from the crank rotation sensor 108. Thus, as an example, the pulse signal output from the wheel rotation sensor 109 is received by the front-wheel rotation input unit 123 and transmitted to the calculation unit 121 as pulse information that has the rotation amount of the wheel 18, and this pulse information is accumulated in the calculation unit 121 in order to calculate information that corresponds to the riding distance. In a similar manner, the pulse signal output from the crank rotation sensor 108 is received by the crank rotation input unit 122 and transmitted to the calculation unit 121 as pulse information that has the rotation amount of the crank 14, and this pulse information is accumulated in the calculation unit 121 in order to calculate information that corresponds to the riding distance. The cumulative value calculated in this manner is compared by the calculation unit 121 so as to control regeneration. Other aspects of the control may be performed similar to the embodiment where wheel speed and crank speed are compared.

SUMMARY

As described above, the regenerative controller 102 for the electric motor includes: the front-wheel rotation sensor 109 on the power-assisted bicycle 1, detecting the rotation amount of the wheel 19 driven via the crank 14, which is rotated by manpower; the crank rotation sensor 108, which detects the rotation amount of the crank 14; and the calculation unit 120, which calculates a first value based on the rotation amount of the wheel 19, a second value based on the rotation amount of the crank 14, and calculates control information (i.e., control parameter) based on at least the second value of the first value and second value, the control information being for performing regenerative control of the rechargeable battery 101 where regenerative charging is performed via the motor 105 supplying riding force to the wheel 19, the calculation unit 120 controlling the regeneration amount of the motor 105 based on this control information/parameter. The first value may be a value expressing a speed of the vehicle calculated based on rotation amount of the wheel 19 (wheel speed), and the second speed may be a value expressing a speed of the vehicle calculated based on rotation amount of the crank 14 (crank speed). Alternatively, the first speed may be a value expressing a traveling distance of the vehicle calculated based on the rotation amount of the wheel 19 (first distance), and the second value may be a value expressing a traveling distance of the vehicle calculated based on the rotation amount of the crank 14 (second distance). This embodiment makes it possible to increase the opportunities for regeneration, thereby enabling efficient power regeneration. Accordingly, it is possible to extend the riding distance on of single charge of the rechargeable battery 101.

When a ratio of the first value (vehicle speed or first distance) to the second value (crank speed or second distance) becomes greater than a prescribed ratio, the calculation unit 120 may control the motor 105 so as to regeneratively charge the rechargeable battery 101. The variation in the proportion of wheel speed to crank speed caused by changes in the crank speed is lower when the power-assisted bicycle 1 is traveling at high speed than when the power-assisted bicycle is traveling at low speed, for example. Thus, the faster the speed of the power-assisted bicycle 1, the fewer opportunities there are for the above-mentioned proportion to exceed a prescribed rate, and the fewer opportunities there are for regeneration; thus, this is effective when emphasizing riding characteristics.

As the ratio of the first value (vehicle speed or first distance) to the second value (crank speed or second distance) becomes greater than the prescribed ratio, the calculation unit 120 may control the motor 105 such that a regenerative charging amount of the rechargeable battery 101 increases. This embodiment makes it possible to increase the amount of power recovered from regeneration. Accordingly, there can be a large amount of regenerated power while reducing the discomfort to the rider, which makes it possible to balance the feel of the ride with regenerative power.

When the ratio of the first value (vehicle speed or first distance) to the second value (crank speed or second distance) exceeds the prescribed ratio, the calculation unit 120 may control the motor 105 such that a regenerative charging amount of the rechargeable battery 101 is a prescribed amount. This embodiment makes it possible to perform regeneration at the maximum charging amount when the ratio of wheel speed to crank wheel speed exceeds a prescribed ratio, for example. Accordingly, along with effective functioning on hills and the like, there is little impact on riding characteristics.

When the ratio of the first value (vehicle speed or first distance) to the second value (crank speed or second distance) exceeds the prescribed ratio, the calculation unit 120 may control the motor 105 so as to regeneratively charge the rechargeable battery 101. This embodiment makes it possible to perform determination for regenerative control at a prescribed speed differential at both low-speed riding and high-speed riding. Therefore, it becomes easier to perform regenerative operation during high-speed riding, which is effective when emphasizing regenerative performance.

As a differential between the first value (vehicle speed or first distance) and the second value (crank speed or second distance) becomes greater, the calculation unit 120 may control the motor 105 such that a regenerative charging amount of the rechargeable battery 101 increases. This embodiment makes it possible to increase the amount of power recovered from regeneration. Accordingly, there can be a large amount of regenerated power while reducing the discomfort to the rider, which makes it possible to balance the feel of the ride with regenerative power.

As a differential between the first value (vehicle speed or first distance) and the second value (crank speed or second distance) becomes greater, the calculation unit 120 may control the motor 105 such that a regenerative charging amount of the rechargeable battery 101 is a prescribed amount. This embodiment makes it possible to perform regeneration at the maximum charging amount when a sufficient speed differential is obtained. Accordingly, along with effective functioning on hills and the like, there is little impact on driving characteristics.

When the first value (vehicle speed) is a value that indicates less than a prescribed speed, the calculation unit 120 may control the motor 105 so as to stop regenerative charging of the rechargeable battery 101. Alternatively, when the first value (first distance) is a value that indicates less than a prescribed distance, the calculation unit 120 may control the motor 105 so as to stop regenerative charging of the rechargeable battery 101. This embodiment makes it easier to micro-adjust the stop location when the rider is stopping the power-assisted bicycle 1. Furthermore, when the rider is pushing the power-assisted bicycle 1 by hand, it is possible to stop regenerative operation and prevent an increase in resistance due to regenerative braking forces.

The calculation unit 120 may control the motor 105 such that a rate of increase of the regeneration amount (slew rate) of the motor 105 changes in accordance with a third value a1 denoting a change amount per prescribed unit of time of a differential between the first value (wheel speed or first distance) and the second value (crank speed or second distance). A slew rate is set for when regenerative control is performed, and the setting value of the slew rate is adjusted in accordance with the change in time of the differential between wheel speed and crank speed, thereby making it possible to soften the shock from regenerative braking. For example, the calculation unit 120 may control the motor 105 such that, when the third value a1 becomes greater than a reference value a1(th), the regeneration amount of the motor 105 increases at a first rate (slew rate 1), and when the third value a1 becomes less than the reference value a1(th), the regeneration amount of the motor 105 increases at a second rate (slew rate 2) that is less than the first rate. Alternatively, as the third value a1 becomes greater, the calculation unit 120 may control the motor 105 such that the rate of increase of the regeneration amount (slew rate) of the motor 105 increases.

The calculation unit 120 may control the motor 105 such that a rate of increase of the regeneration amount (slew rate) of the motor 105 changes in accordance with a third value a(Crank) denoting a change amount per prescribed unit of time between the second value (crank speed or second distance) at a first time t1 and the second value (crank speed or second distance) at a second time t0 after the first time. A slew rate is set for when regenerative control is performed, and the setting value of the slew rate is adjusted in accordance with the change in time of the differential between crank speeds at different times, thereby making it possible to soften the shock from regenerative braking. For example, the calculation unit 120 may control the motor 105 such that, when the third value a(Crank) becomes greater than a reference value a(Crank)(TH), the regeneration amount of the motor 105 increases at a first rate (slew rate 1'), and when the third value a(Crank) becomes less than the reference value a(Crank)(TH), the regeneration amount of the motor 105 increases at a second rate (slew rate 2') that is less than the first rate (slew rate 1'). Alternatively, as the third value a(Crank) becomes greater, the calculation unit 120 may control the motor 105 such that the rate of increase of the regeneration amount (slew rate) of the motor 105 increases.

When a prescribed mode is selected from a plurality of modes denoting operational aspects of the motor 105, the calculation unit 120 may control the motor 105 so as to regeneratively charge the rechargeable battery 101. This embodiment makes it possible to reflect the intentions of the rider and improve the feel of the ride.

Alternatively, a regenerative driver for an electric motor includes the motor 105 and the regenerative controller 102. Alternatively, a power-assisted vehicle 1 includes the vehicle body and the regenerative driver for the electric motor described above. This embodiment makes it possible to increase the opportunities for regeneration, thereby enabling efficient power regeneration. Accordingly, it is possible to extend the riding distance on of single charge of the rechargeable battery 101.

Embodiments of the present invention were described above, but the present invention is not limited thereto. The material, form, and arrangement of the various components described above are not limited to the embodiments of the present invention and can have various modifications without departing from the spirit of the invention.

As an example, in the present embodiment, the wheel 18 that was not being driven by manpower was driven electrically driven by the motor 105, but the motor 105 may rotatingly drive the wheel 19 that is driven by manpower instead.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A regenerative controller for an electric motor that supplies driving power to a vehicle and that regeneratively charges a power storage device in the vehicle, comprising:
   a wheel rotation detection unit to be provided on the vehicle detecting a rotation amount of one of wheels of the vehicle;
   a crank rotation detection unit to be provided on the vehicle detecting a rotation amount of a crank that is configured to be rotatable by a user so as to drive one of the wheels of the vehicle; and
   a controller that calculates a first value based on the detected rotation amount of said one of the wheels, a second value based on the detected rotation amount of the crank, and a control parameter based on at least the second value among the first value and the second value, the controller determining whether to perform regeneration charging of the power storage device via the electric motor based on a relative difference between the first value and the second value, and when the regeneration charging is determined to be performed, the controller determining a regeneration amount of the electric motor in accordance with said control parameter, and controlling the electric motor such that the electric motor regeneratively charges the power storage device at the determined regeneration amount.

2. The regenerative controller for the electric motor according to claim 1, wherein the first value is a speed of the vehicle that is calculated based on the detected rotation amount of said one of the wheels, and the second value is a speed of the vehicle that is calculated based on the detected rotation amount of the crank.

3. The regenerative controller for the electric motor according to claim 1, wherein the first value is a traveling distance of the vehicle that is calculated based on the detected rotation amount of said one of the wheels, and the second value is a traveling distance of the vehicle that is calculated based on the detected rotation amount of the crank.

4. The regenerative controller for the electric motor according to claim 1, wherein said relative difference between the first value and the second value is a ratio of the first value to the second value, and when the ratio becomes greater than a prescribed ratio, the controller controls the electric motor so as to perform the regenerative charging of the power storage device.

5. The regenerative controller for the electric motor according to claim 4, wherein said control parameter is an amount by which the ratio of the first value to the second exceeds the prescribed ratio, and the controller controls the electric motor such that as the ratio of the first value to the second value becomes greater than the prescribed ratio, the regeneration amount of the electric motor increases.

6. The regenerative controller for the electric motor according to claim 4, wherein said control parameter is an amount by which the ratio of the first value to the second exceeds the prescribed ratio, and the controller controls the electric motor such that, when the ratio of the first value to the second value exceeds the prescribed ratio, the regeneration amount of the electric motor remains constant at a prescribed amount.

7. The regenerative controller for the electric motor according to claim 1, wherein said relative difference between the first value and the second value is an amount by which the first value exceeds the second value, and when the first value becomes greater than the second value more than a prescribed value, the controller controls the electric motor so as to perform the regenerative charging of the power storage device.

8. The regenerative controller for the electric motor according to claim 7, wherein said control parameter is a differential amount by which the first value exceeds the second exceeds more than the prescribed value, and the controller controls the electric motor such that as a differential between the first value and the second value becomes greater than the prescribed value, the regeneration amount of the electric motor increases.

9. The regenerative controller for the electric motor according to claim 7, wherein said control parameter is a differential amount by which the first value exceeds the second value more than the prescribed value, and the controller controls the electric motor such that when a differential between the first value and the second value exceeds the prescribed value, the regeneration amount of the electric motor remains constant at a prescribed amount.

10. The regenerative controller for the electric motor according to claim 2, wherein, when the first value is a value that indicates less than a prescribed speed of the vehicle, the controller controls the electric motor so as to stop the regenerative charging of the power storage device.

11. The regenerative controller for the electric motor according to claim 3, wherein, when the first value is a value that indicates less than a prescribed travelling distance of the vehicle, the controller controls the electric motor so as to stop regenerative charging of the power storage device.

12. The regenerative controller for the electric motor according to claim 1, wherein said control parameter is a third value calculated by the controller that indicates a change amount per unit time of a differential between the first value and the second value, and the controller controls the electric motor such that a rate of increase of the regeneration amount of the electric motor changes in accordance with said third value.

13. The regenerative controller for the electric motor according to claim 12, wherein the controller controls the electric motor such that, when the third value is greater than a reference value, the rate of increase of the regeneration amount of the electric motor is set at a first rate, and when the third value is less than the reference value, the rate of increase of the regeneration amount of the electric motor is set at a second rate that is less than the first rate.

14. The regenerative controller for the electric motor according to claim 12, wherein the controller controls the electric motor such that as the third value becomes greater, the rate of increase of the regeneration amount of the electric motor increases.

15. The regenerative controller for the electric motor according to claim 1, wherein said control parameter is a third value calculated by the controller that indicates a change amount of the second value per unit time between a first time and a second time after the first time, and the controller controls the electric motor such that a rate of increase of the regeneration amount of the electric motor changes in accordance with said third value.

16. The regenerative controller for the electric motor according to claim 15, wherein the controller controls the electric motor such that, when the third value is greater than a reference value, the rate of increase of the regeneration amount of the electric motor is set at a first rate, and when the third value is less than the reference value, the rate of increase of the regeneration amount of the electric motor is set at a second rate that is less than the first rate.

17. The regenerative controller for the electric motor according to claim 15, wherein the controller controls the electric motor such that as the third value becomes greater, the rate of increase of the regeneration amount of the electric motor increases.

18. The regenerative controller for the electric motor according to claim 1, wherein the regenerative controller is configured to have a plurality of user-selectable operation modes and, when a prescribed mode is selected from the plurality of operation modes by a user, the controller controls the electric motor so as to regeneratively charge the power storage device.

19. A regenerative driver for an electric motor, comprising:
the regenerative controller according to claim 1; and
the electric motor controlled by the regenerative controller.

20. A power-assisted vehicle, comprising:
the regenerative driver according to claim 19; and
the vehicle having the regenerative driver installed therein.

* * * * *